(12) United States Patent
Ohishi et al.

(10) Patent No.: US 7,805,812 B2
(45) Date of Patent: Oct. 5, 2010

(54) GRIP

(75) Inventors: Yasuo Ohishi, Niizashi (JP); Yumiko Higashi, Niizashi (JP)

(73) Assignee: Honda Access Corp., Saitama (JP)

( * ) Notice: Subject to any disclaimer, the term of this patent is extended or adjusted under 35 U.S.C. 154(b) by 450 days.

(21) Appl. No.: 11/412,078

(22) Filed: Apr. 27, 2006

(65) Prior Publication Data

US 2006/0248683 A1 Nov. 9, 2006

(30) Foreign Application Priority Data

Apr. 28, 2005 (JP) ............................. 2005-133287
Apr. 28, 2005 (JP) ............................. 2005-133288

(51) Int. Cl.
*B25G 1/10* (2006.01)
(52) U.S. Cl. ....................................................... 16/421
(58) Field of Classification Search .................. 16/421, 16/110.1, 430, 431, 436, DIG. 12, DIG. 18, 16/DIG. 19, 444, 445; 219/204, 221, 226, 219/202, 534, 539, 540, 201, 228; 30/340; 15/143.1, DIG. 10; 74/551.9; 81/177.1, 81/489, 900
See application file for complete search history.

(56) References Cited

U.S. PATENT DOCUMENTS

| 744,739 | A | * | 11/1903 | Fliess ........................... 219/201 |
| 4,440,421 | A | * | 4/1984 | Adamson ..................... 280/821 |
| 4,598,192 | A | * | 7/1986 | Garrett ......................... 219/201 |
| 5,613,407 | A | * | 3/1997 | Ogata ........................... 74/551.9 |
| 5,626,780 | A | * | 5/1997 | Ogata ........................... 219/204 |
| 5,735,037 | A | * | 4/1998 | Ogata ............................ 29/611 |
| 5,823,069 | A | * | 10/1998 | Roark et al. ................. 74/551.9 |
| 5,834,734 | A | * | 11/1998 | Ogata ........................... 219/204 |
| 5,973,294 | A | * | 10/1999 | Schatt et al. ................. 219/228 |
| 6,003,188 | A | * | 12/1999 | Henry et al. ................. 15/143.1 |
| 6,114,668 | A | * | 9/2000 | Ogata et al. ................. 219/494 |
| 6,122,802 | A | * | 9/2000 | Lo ................................ 16/431 |
| 6,164,003 | A | * | 12/2000 | Miller ........................ 42/71.01 |

(Continued)

FOREIGN PATENT DOCUMENTS

JP 62-16073 U 1/1987

(Continued)

OTHER PUBLICATIONS

Office Action mailed Mar. 2, 2009 in corresponding Japanese Patent Application No. 2005-133288.

*Primary Examiner*—Victor Batson
*Assistant Examiner*—Matthew Sullivan
(74) *Attorney, Agent, or Firm*—Westerman, Hattori, Daniels & Adrian, LLP

(57) ABSTRACT

A grip body including a mounting portion, an inner piece supported by the mounting portion and at least a resin communication passage therebetween. The inner piece includes inner and outer surfaces, and a resin layer is integrally formed on the inner and outer surfaces of the inner piece by resin extending therebetween through the resin communication passage. The grip body also includes at least one plate having an insertion rod formed thereon, the plate being fixed to the inner piece by insertion engagement of the insertion rod into the resin communication passage. The plate is heated by providing a heating member attached at a position where the heating of temperature of a resin surface portion of the grip body is desired.

15 Claims, 19 Drawing Sheets

U.S. PATENT DOCUMENTS

| | | | | |
|---|---|---|---|---|
| 6,326,593 | B1 * | 12/2001 | Bonn et al. | 219/204 |
| 6,581,247 | B1 * | 6/2003 | Yu Chen | 16/430 |
| 6,594,862 | B2 * | 7/2003 | Totani et al. | 16/430 |
| 6,601,978 | B2 * | 8/2003 | Andrea et al. | 362/497 |
| 6,631,927 | B1 * | 10/2003 | Vold | 280/821 |
| 6,742,215 | B2 * | 6/2004 | Panfili et al. | 15/236.01 |
| 7,010,997 | B2 * | 3/2006 | Dzurnak | 74/551.9 |
| 2003/0097730 | A1 * | 5/2003 | Leufen et al. | 16/110.1 |
| 2003/0218007 | A1 * | 11/2003 | Cornell | 219/541 |
| 2004/0007567 | A1 * | 1/2004 | Downey et al. | 219/494 |

FOREIGN PATENT DOCUMENTS

| | | |
|---|---|---|
| JP | 10-067366 A | 3/1998 |
| JP | 10-081282 A | 3/1998 |

* cited by examiner

GRIP

BACKGROUND OF THE INVENTION

1. Field of the Invention

The present invention relates to a grip which is mounted on a steering handle of, for example, a motorcycle, a four-wheeled or three-wheeled buggy car, a snow mobile, a surface motorcycle or the like or a grip which is provided as such a steering handle.

2. Description of the Related Art

For example, in attaching a plate on which, for example, letters, patterns or the like which form a trade mark, an advertisement or the like are displayed to a surface of a grip, a recessed portion for mounting the plate is formed in a surface of the grip and the plate is engaged with the recessed portion or is fixed by adhesion to the recessed portion using an adhesive agent (for example, an adhesive tape). However, a load is frequently applied to the plate in the rotating direction due to a gripping force, a throttle manipulation or the like and hence, the mounting structure cannot maintain the sufficient mounting strength over a long period.

Further, the mounting of the plate using bolts exhibits poor operability and, when a hard core exists inside, for example, when an inner piece which becomes a grip core for arranging a heater to form a heater incorporated grip (for example, by arranging a string-like heater in a winding manner) exists, the mounting of the plate using the bolts is not easy and hence, the firm fixing of the plate to a surface of the grip is difficult whereby the assurance of the strength pushes up the cost.

On the other hand, for example, a rider's hand which holds a grip (a steering handle) of a motorcycle or the like is exposed to wind and rain so that the hand is remarkably chilled during the winter season or the like and hence, a heater incorporated grip which incorporates a heater therein and heats the grip when necessary is adopted.

Such a heater incorporated grip adopts, for example, the constitution in which a heater is disposed in an inner piece (for example, the string-like heater is disposed in a winding manner) and a resin is applied to the inner piece by molding or the constitution in which a grip outer cylindrical portion is fitted on an inner piece in which a heater is disposed in the above-mentioned manner or in other technique. However, the thicker the resin layer, it is more difficult to heat the surface and the electric power consumption is increased accordingly and hence, there may be a case that the heating sufficient to warm the hand cannot be ensured.

On the other hand, although the heating may be easily ensured by making a thickness of the resin layer small, such a constitution damages the design property and the grip feeling.

SUMMARY OF THE INVENTION

The present invention has been made under such circumstances and it is an object of the present invention to provide an innovative grip which, in both of a heater which incorporates an inner piece therein and a heater incorporated grip which incorporates an inner piece in which a heater is disposed therein, allows the mounting and the fixing of a plate on a surface of a grip using a simple mounting method, at a low cost and with an extremely large mounting strength by focusing on a resin communication hole for applying resin molds on front and back surfaces of an inner piece, by making use of the resin communication hole as a mounting hole, and by inserting an insertion rod mounted on a plate into the resin communication hole so as to engage and fix the plate to the inner piece.

Further, it is another object of the present invention to provide an innovative heater incorporated grip which can effectively heat given positions and exhibits the excellent practicability. That is, the heater incorporated grip of the present invention adopts the constitution which can easily set heating spots at portions (range) on a surface of the grip which are to be heated (temperature being elevated). Although the grip includes a resin surface, by forming the heat spots of high temperature which exhibits the favorable heat transfer, even when the heater is not arranged finely, it is possible to efficiently heat rider's fingers or positions close to the rider's fingers, for example, or it is possible to allow the rider to easily find ranges of these heat spots.

The present invention, as described above, provides the innovative grip which, in both of a heater which incorporates an inner piece therein and a heater incorporated grip which incorporates an inner piece in which a heater is disposed therein, allows the mounting and the fixing of the plate on the surface of the grip using a simple mounting method, at a low cost and with an extremely large mounting strength by making use of the resin communication passage (hole) for applying resin molds on outer and inner surfaces of the inner piece as the mounting hole, and by inserting the insertion rod mounted on the plate into the resin communication hole to engage and fix the insertion engagement of the insertion rod to the inner piece.

According to a second aspect of the invention, the present invention can be more easily realized. Particularly, in the third aspect of the invention, the plate does not project from the surface of the grip and hence, the design property and the grip feeling are enhanced. Further, since the plate is accommodated in the inside of the recessed portion, a load to remove the plate is hardly applied to the plate and hence, the excellent mounting durability can be ensured correspondingly. Still further, the insertion rod of the plate penetrates the resin communication hole at the portion which has a small thickness due to the provision of the recessed portion and hence, the insertion of the insertion rod is further facilitated thus providing the innovative grip which exhibits extreme practicability.

Further, in a fourth aspect of the invention, the grip body can be easily and resiliently held on the mounting portion. Further, for example, by forming the resin communication hole at the position which avoids the press-fit holding projecting portion for press-fit holding, for example, even when the insertion rod is inserted into the resin communication hole or the insertion rod penetrates the resin communication hole and projects into the inside of the inner piece, the plate can be easily and firmly engaged and fixed without causing any trouble in the press-fit holding action of the press-fit projecting portion whereby it is possible to provide further excellent grip.

Further, in a fifth aspect of the invention, since the removal prevention engaging groove which is engaged with a hole periphery of the resin communication hole is formed in the insertion rod mounted on the plate, a removal prevention function works by merely inserting the insertion rod into the resin communication hole thus enabling the simpler mounting and the firmer engaging and fixing of the plate whereby it is possible to provide the further excellent grip.

Further, in a sixth aspect of the invention, although the heater is wound around the inner piece, a large number of resin communication holes are formed at positions which avoid the heater. Accordingly, by merely providing the constitution which allows the selection of the resin communication holes and the insertion of the insertion rods in the resin communication holes at a plurality of given portions, it is surely possible to firmly engage and fix the plate while obviating the heater whereby it is possible to provide the further excellent heater incorporated grip which can firmly attach the plate to the grip body with favorable durability.

Further, in a seventh aspect of the invention, by forming heat spots to which the heat of the heater is favorably transferred and which exhibits a high temperature compared to other resin surface portions, it is possible to heat the rider's fingers or positions close to the rider's fingers or it is possible to perform the accurate heat adjustment within a range of the heat spot whereby it is possible to provide the extremely innovative grip which possesses extremely excellent practicability which can efficiently heat the given positions in accordance with the design.

Particularly in an eighth aspect of the invention, the plate is disposed in the recessed portion formed in the resin surface portion and hence, the plate is disposed at a portion which has a small thickness. Accordingly, the heat transfer to the plate is improved and the projecting of the plate from the surface can be suppressed correspondingly whereby it is possible to provide further excellent grip which can enhance the mounting strength even when a holding strength and a load in the rotational direction attributed to the throttle manipulation work frequently.

Further, in a ninth aspect of the invention, since the insertion rod is disposed close to the heater and hence, the insertion rod functions as a heat conduction portion whereby the plate is elevated to a high temperature with further improved responsiveness and, at the same time, in a tenth aspect of the invention, particularly, the plate can be mounted and fixed more easily and firmly and hence, the arrangement setting and the mounting of the plate are facilitated whereby it is possible to provide the extremely innovative grip which can easily form the heat spots in place.

Accordingly, for example, by inserting and engaging the insertion rod which extends vertically downwardly from the plate into the resin communication hole formed in the inner piece while engaging the plate in the recessed portion, the mounting strength and the stability can be enhanced greatly and, at the same time, the plate can be easily mounted. Further, due to the arrangement of the plate on the thin wall portion with the provision of the recessed portion and the arrangement of the insertion hole close to the heater, the insertion rod functions as the heat conduction portion and hence, the plate is elevated to a high temperature with improved responsiveness and, at the same time, as described above, the plate can be arranged and set more easily and hence, it is possible to provide the extremely innovative grip which can easily form the heat spots in place.

Further, in a twelfth aspect of the invention, it is possible to easily resiliently hold the grip body on the mounting portion. Further, for example, by forming the resin communication hole at a position which avoids the press-fit holding projecting portion for press-fitting and holding, it is possible to provide a further excellent grip which can easily and firmly engage and fix the plate without obstructing the press-fit holding operation of the press-fit holding projecting portion even when the insertion rod is inserted into the resin communication hole or penetrates the resin communication hole and projects to the inside of the inner piece.

Further, in a thirteenth aspect of the invention, it is possible to provide the grip which can exhibit a further favorable manner of operation and advantageous effects and can possess further excellent practicability.

BRIEF DESCRIPTION OF THE DRAWINGS

FIG. 8A and FIG. 8B show a plate of another embodiment (second embodiment), wherein FIG. 8A is a perspective view and FIG. 8B is an explanatory side cross-sectional view;

FIG. 21A and FIG. 21B show a plate of another embodiment (sixth embodiment), wherein FIG. 21A is a perspective view and FIG. 21B is an explanatory side cross-sectional view;

DESCRIPTION OF THE PREFERRED EMBODIMENTS

Figure 1:
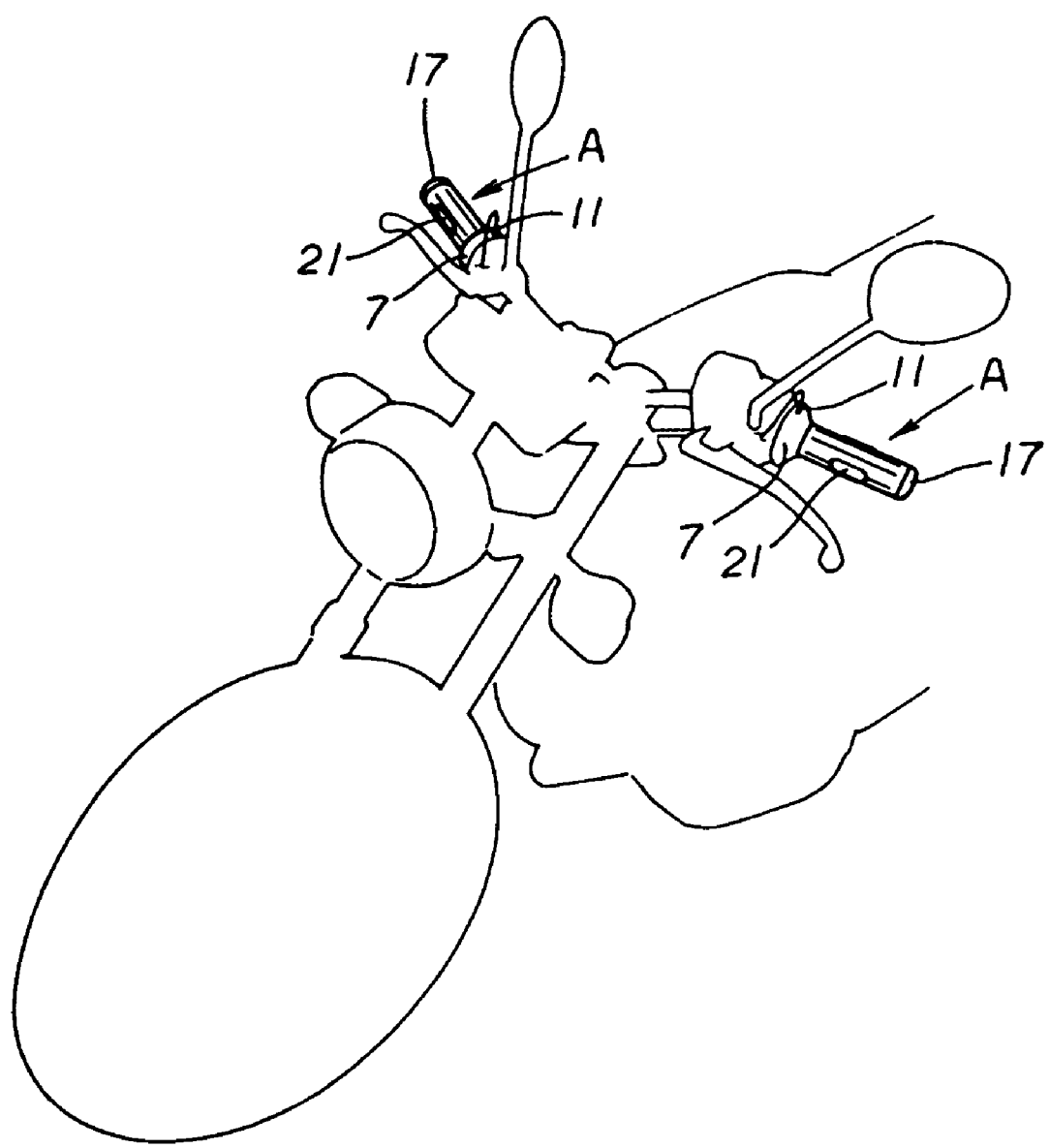
FIG. 1 is an explanatory perspective view showing a use state of a first embodiment.
Figure 2:
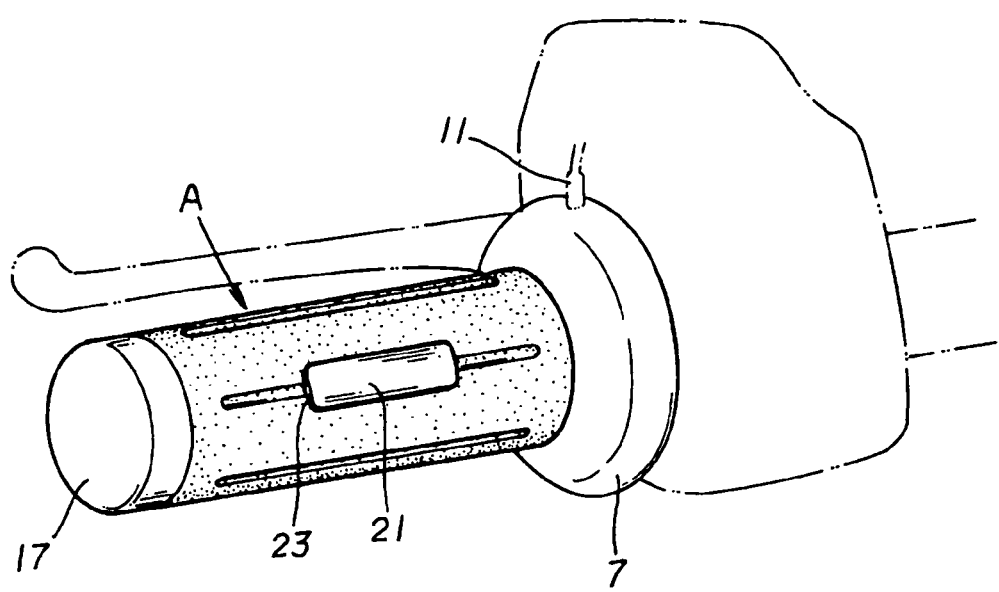
FIG. 2 is a perspective view of the first embodiment.
Figure 3:
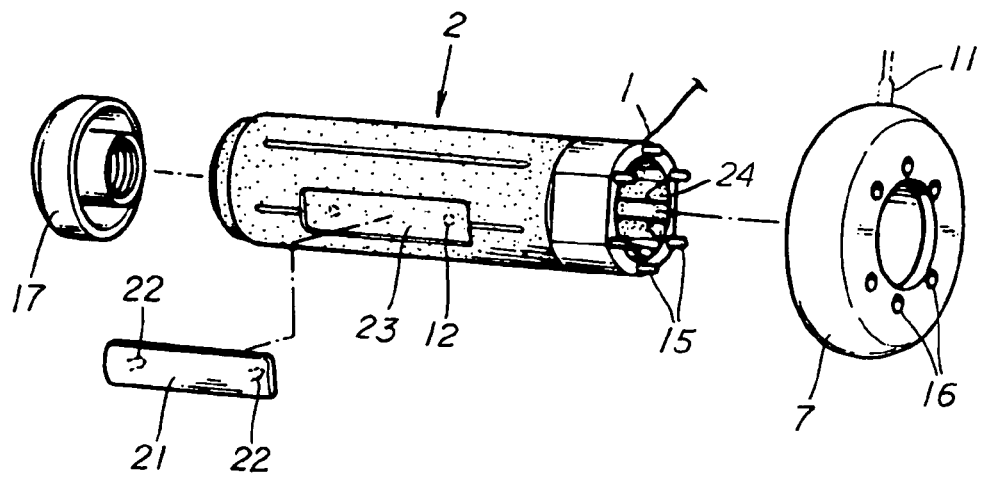
FIG. 3 is an explanatory exploded perspective view of the first embodiment.
Figure 4:
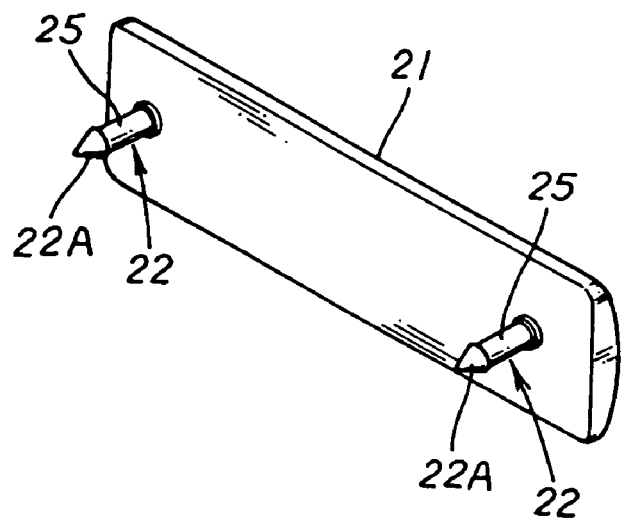
FIG. 4 is a perspective view of a plate of the first embodiment.
Figure 5:
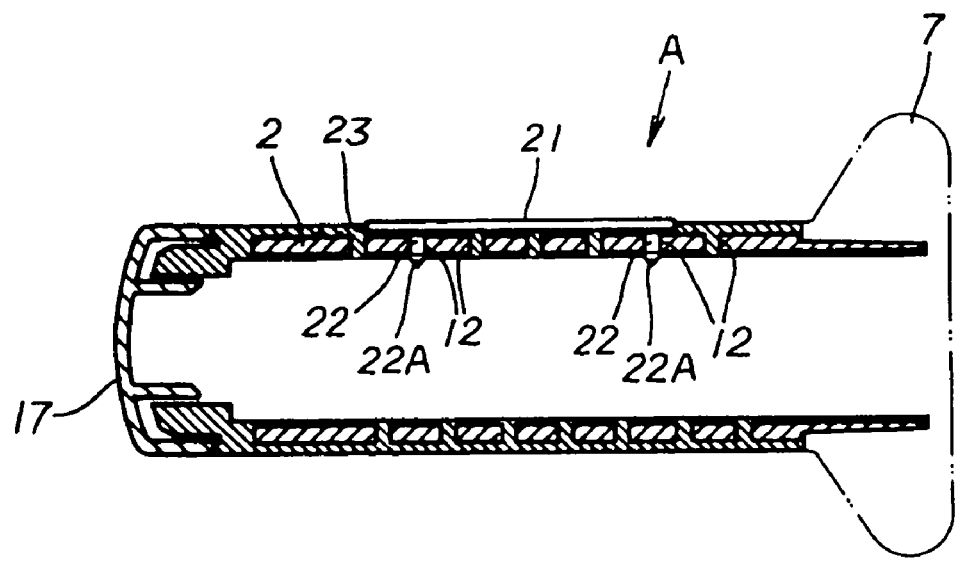
FIG. 5 is a front cross-sectional view of the first embodiment.
Figure 6:
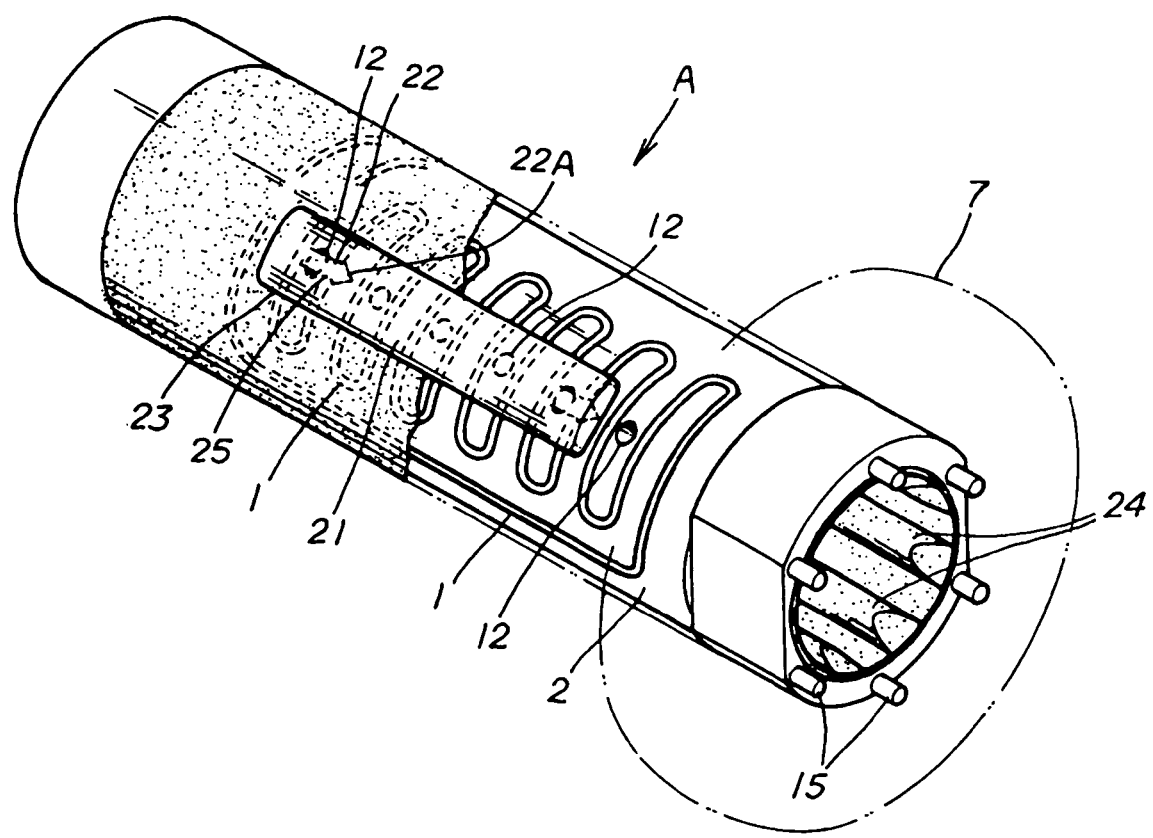
FIG. 6 is an explanatory perspective view which allows the observation of an inner piece with naked eyes by depicting a resin mold portion of the first embodiment in an imaginary line.
Figure 7:
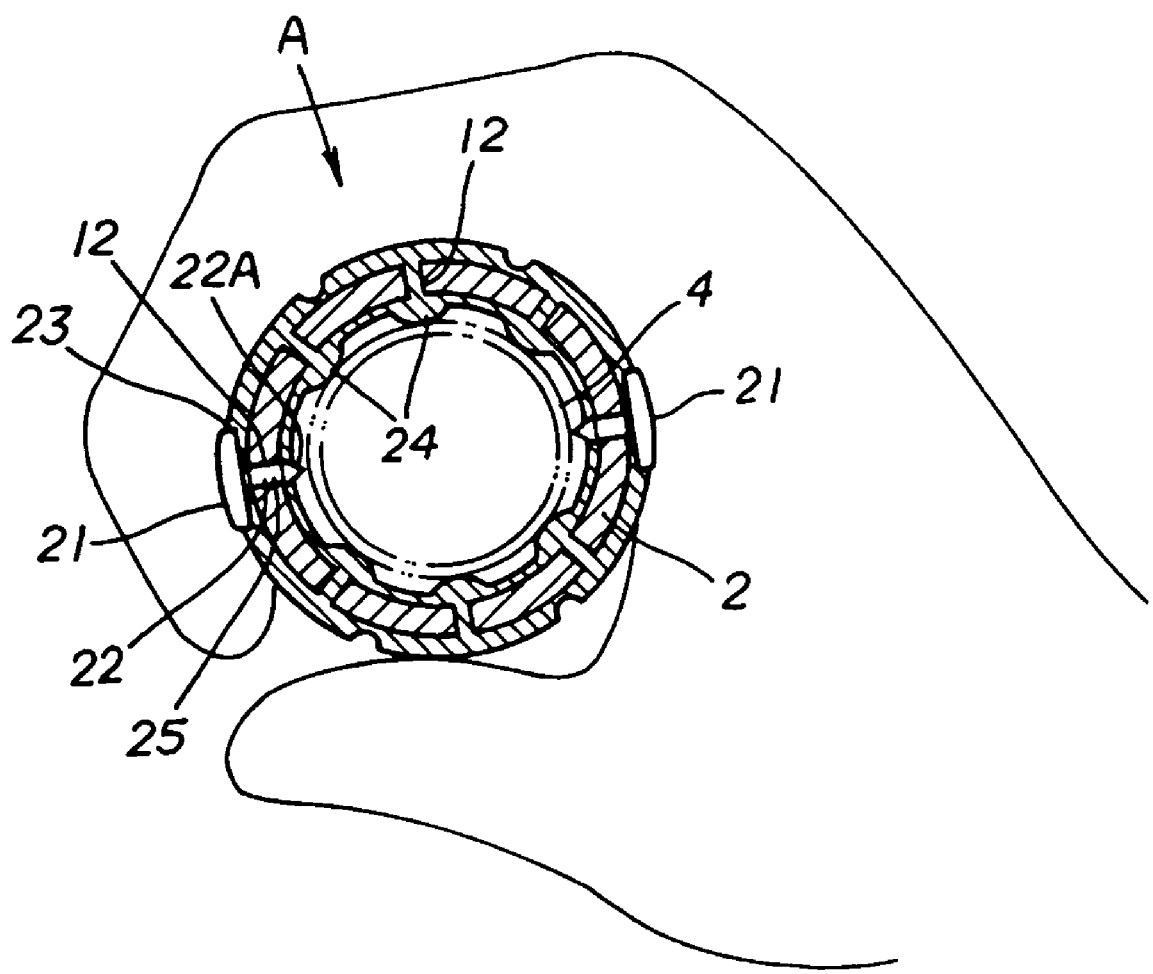
FIG. 7 is an explanatory side cross-sectional view of the use state of the first embodiment.

Preferred modes for carrying out the present invention (the manner of carrying out the present invention) are simply explained showing the manner of operation of the present invention in conjunction with drawings.

First of all, the first to sixth aspects of the invention which are characterized by the mounting structure of a plate 21 are explained below with reference to FIGS. 1-11.

By making use of resin communication holes 12 through which resins which are molded on a front surface and a back surface of an inner piece 2 are communicated and integrally formed with each other as mounting holes, insertion rods 22 which are mounted on the plate 21 are inserted into the resin communication holes 12 thus engaging and fixing the plate 21 to an outer surface portion of a grip body A.

The inner piece 2 is interiorly mounted on a grip in a state that the inner piece 2 is fitted on a handle pipe or a throttle pipe which constitutes a mounting portion 4 in the case of a motorcycle, for example. Resins are molded on inner and outer surfaces of the inner piece 2.

For example, the resin molded on the outer surface wraps around the inner side through the above-mentioned resin communication holes 12 and the grip is press-fitted and held by the resin on the inner side when the mounting portion 4 is inserted into the inner piece 2.

That is, the resin on the outer surface and the resin on the inner surface communicate and are integrally formed with each other through the above-mentioned resin communication holes 12 thus enhancing the covering strength of the molded resin. Here, for example, by forming press-fit holding projecting portions 24 on the inner surface of the inner piece 2 by resin molding, when the mounting portion 4 is press-fitted into the inner piece 2, the inner piece 2 is resiliently held by the press-fit holding projecting portions 24 whereby the mounting portion 4 can be firmly and resiliently held. Further, in this case, by arranging the resin communication holes 12 between the press-fit holding projecting portions 24, for example, the resin communication holes 12 are provided at positions which avoid the press-fit holding projecting portions 24 and hence, even when the insertion rods 22 are inserted into the resin communication holes 12 or penetrate the resin communication holes 12 and project to the inside from the resin communication holes 12, it is possible to easily and firmly engage and fix the plate 21 without obstructing a press-fit holding action of the press-fit holding projecting portions 24.

Further, for example, to provide a heater incorporated grip, a heater 1 is arranged in the inner piece 2 and is molded with resin thus forming the heater 1 in the inner piece 2 in an embedded state.

Figure 9:
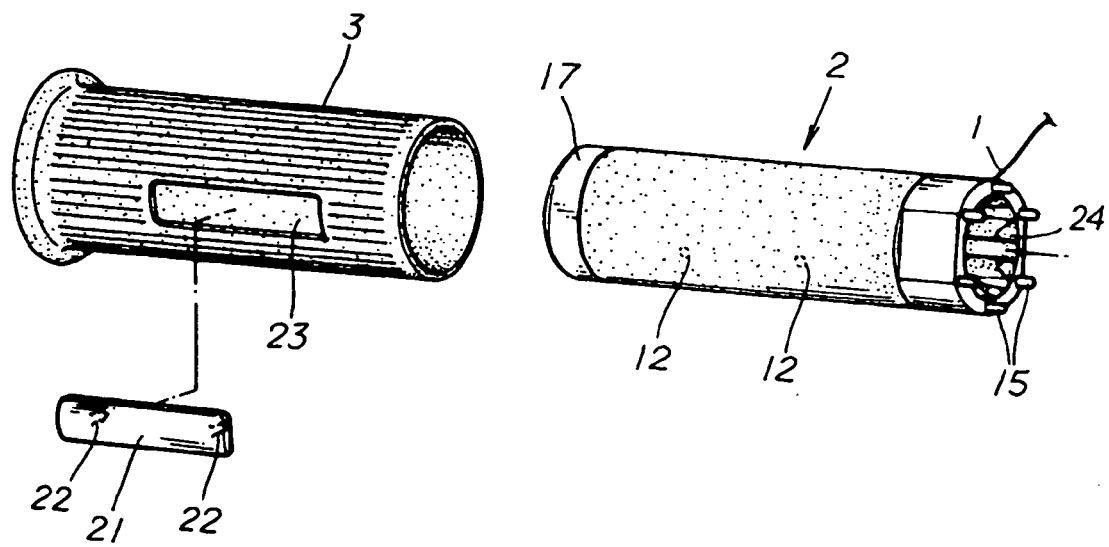
FIG. 9 is an explanatory exploded perspective view of another embodiment (third embodiment)
Figure 11:
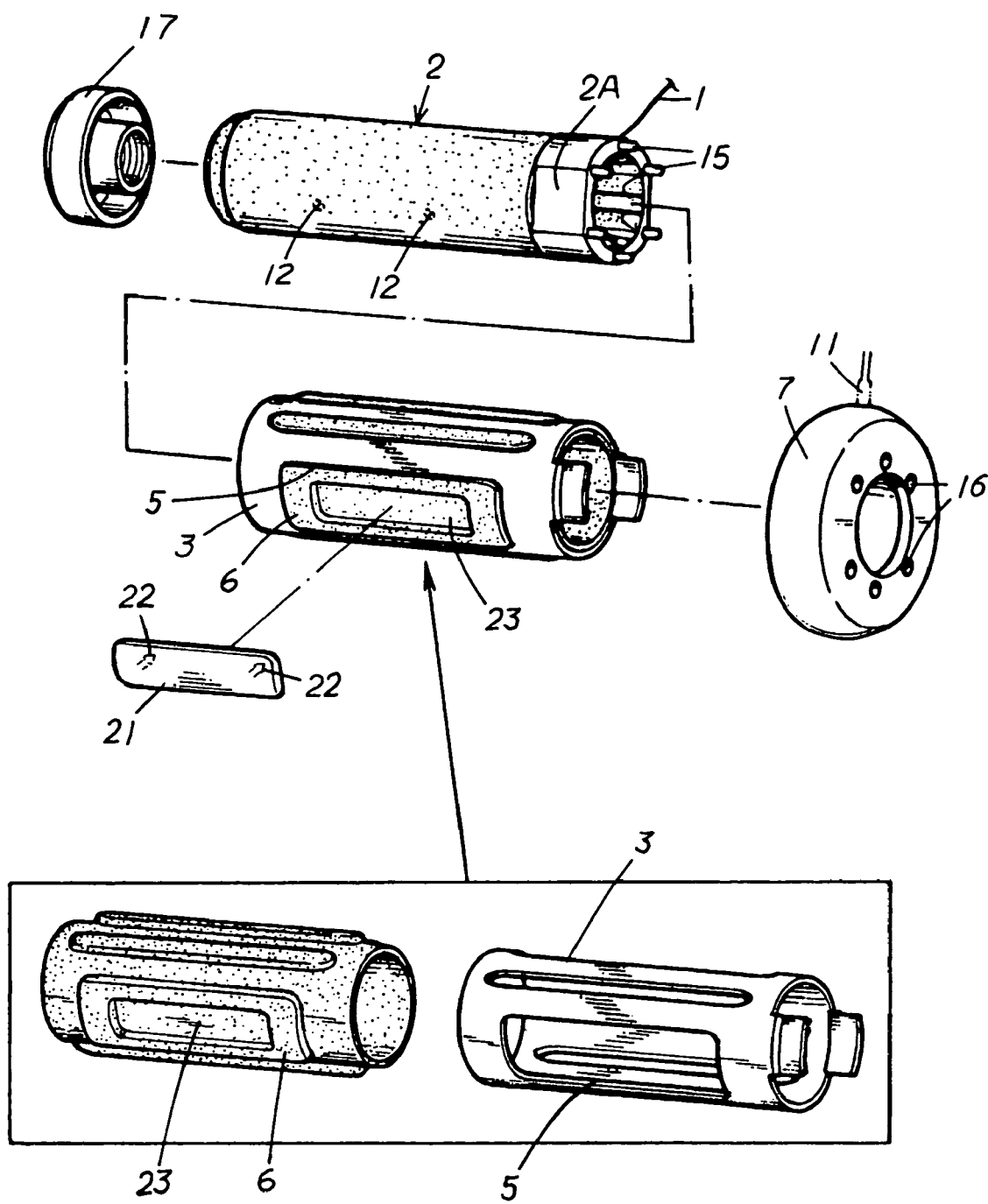
FIG. 11 is an explanatory exploded perspective view of another embodiment (fourth embodiment)
Figure 12:
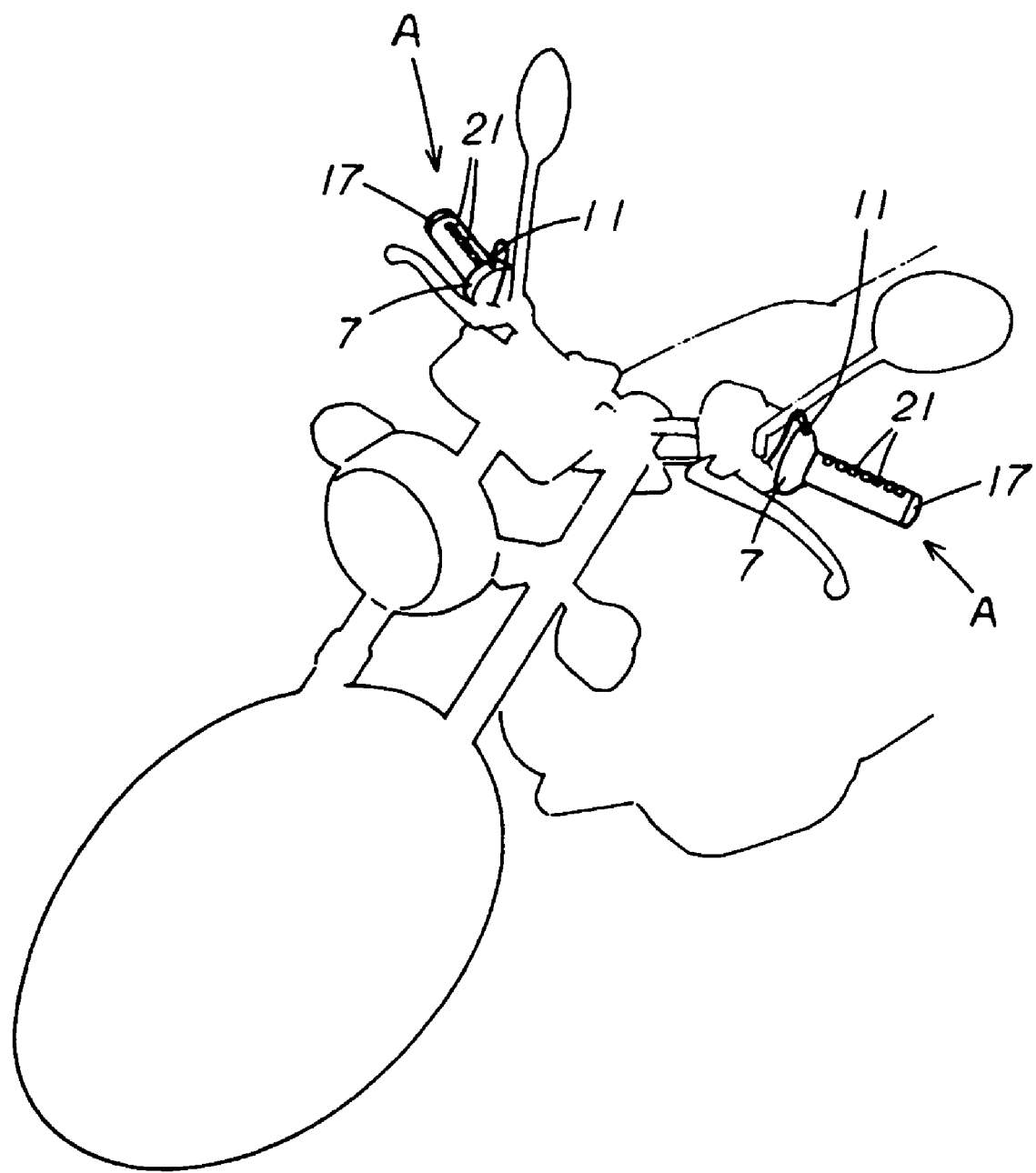
FIG. 12 is an explanatory perspective view showing a use state of a fifth embodiment.
Figure 13:
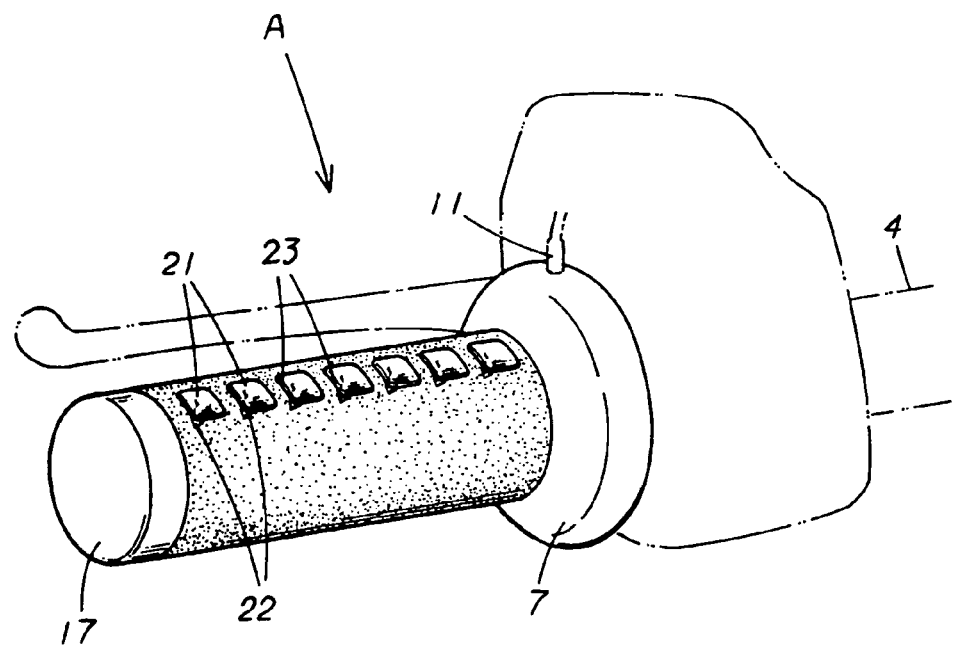
FIG. 13 is a perspective view of the fifth embodiment.
Figure 14:
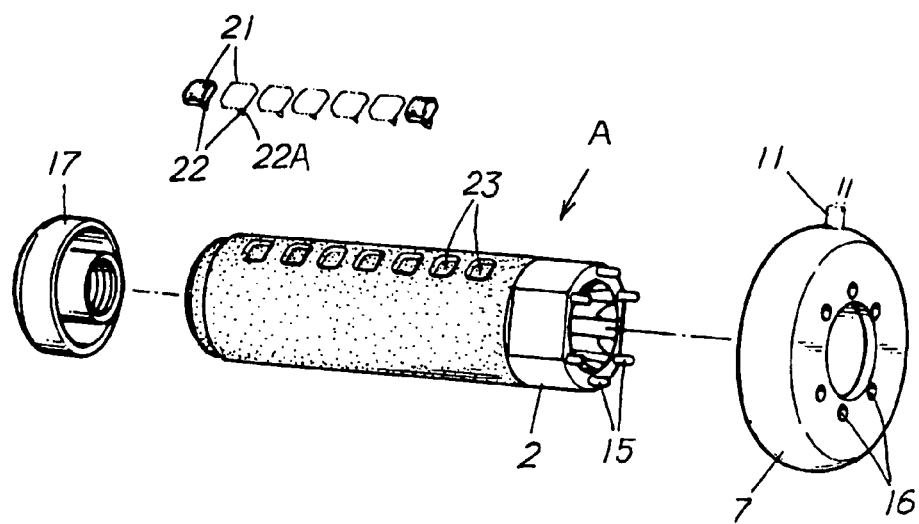
FIG. 14 is an explanatory exploded perspective view of the fifth embodiment.
Figure 15:
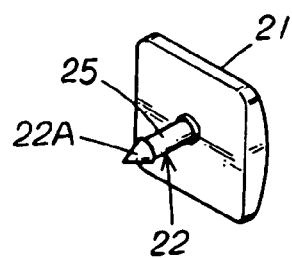
FIG. 15 is a perspective view of a plate of the fifth embodiment.
Figure 16:
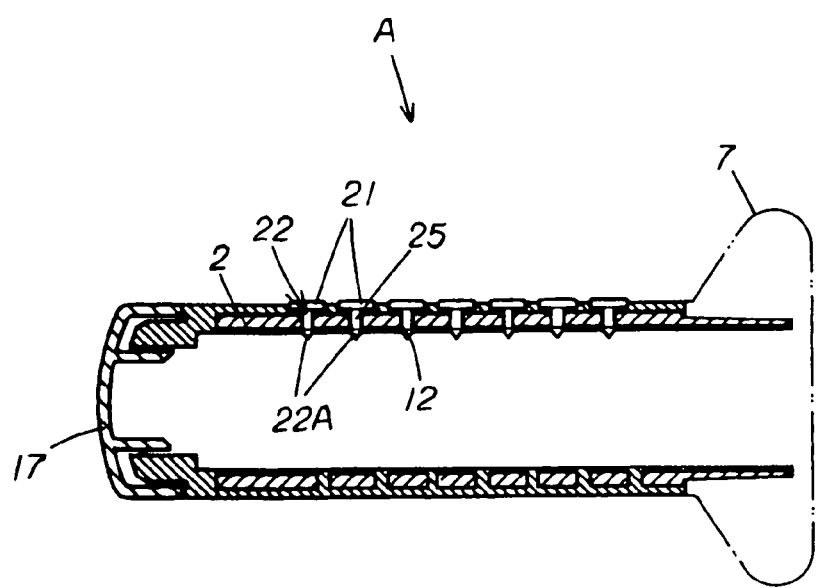
FIG. 16 is a front cross-sectional view of the fifth embodiment.
Figure 17:
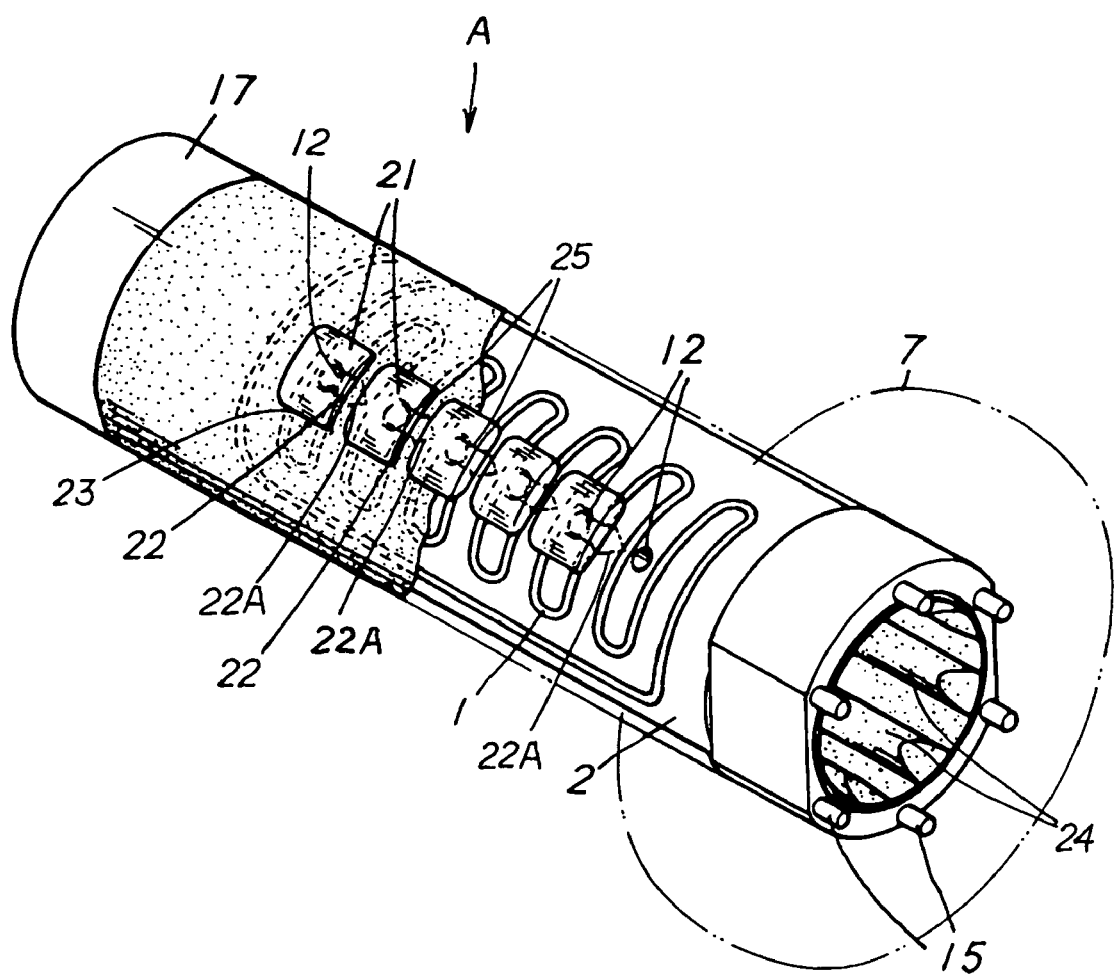
FIG. 17 is an explanatory perspective view which allows the observation of an inner piece with naked eyes by depicting a resin mold portion of the fifth embodiment in an imaginary line.
Figure 18:
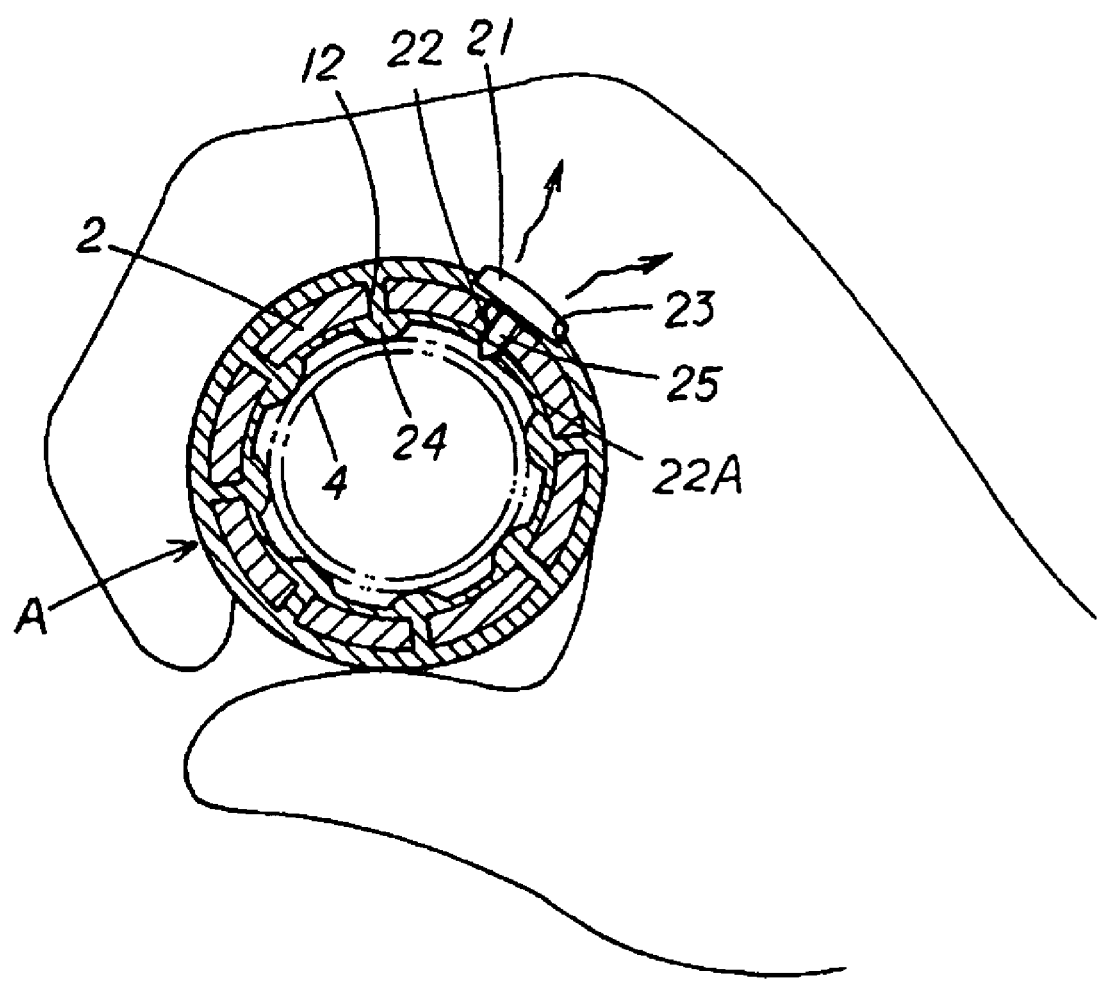
FIG. 18 is an explanatory side cross-sectional view of the use state of the fifth embodiment.
Figure 19:
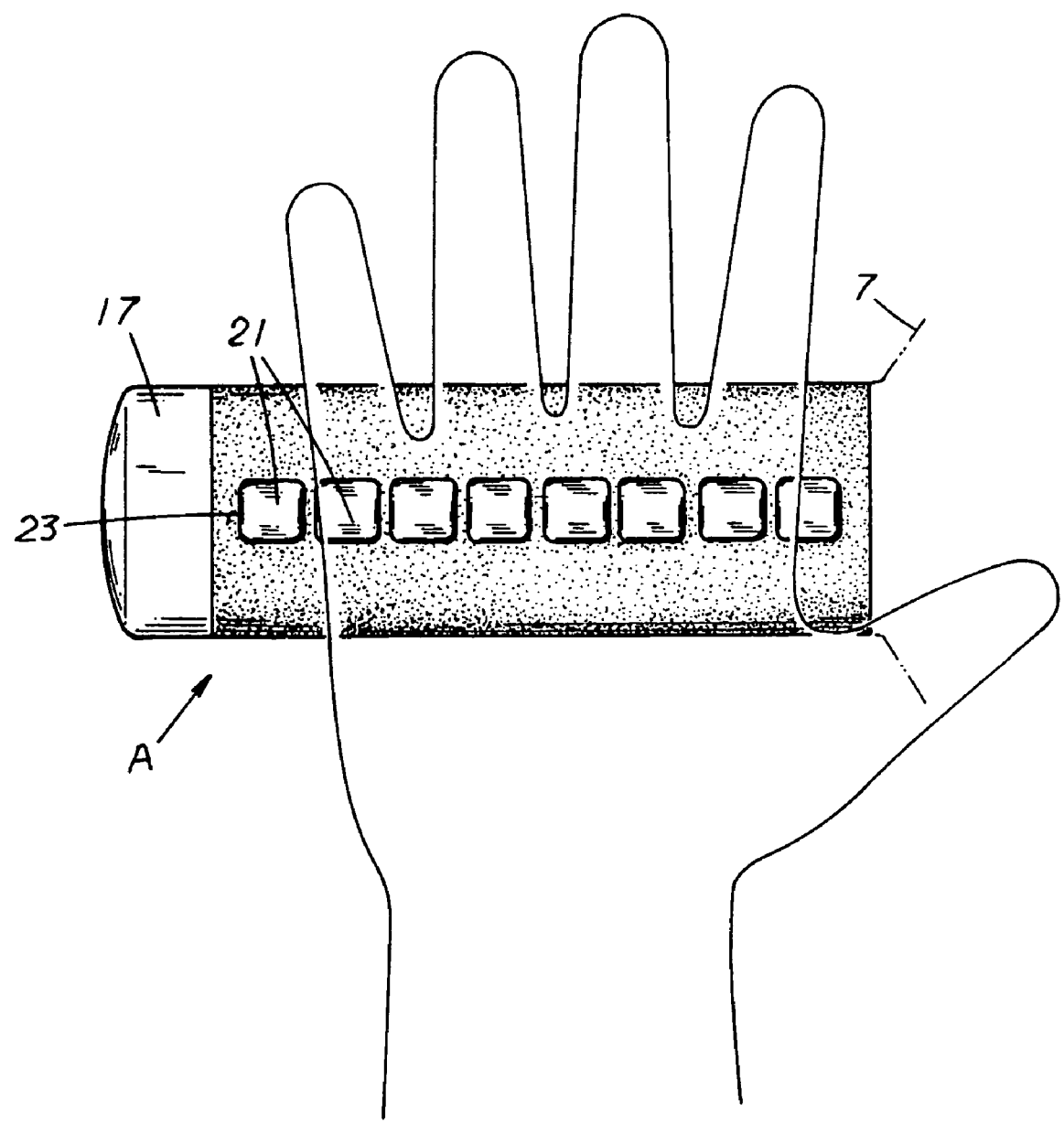
FIG. 19 is an explanatory front view showing the arrangement position of the plate of the fifth embodiment.
Figure 20:
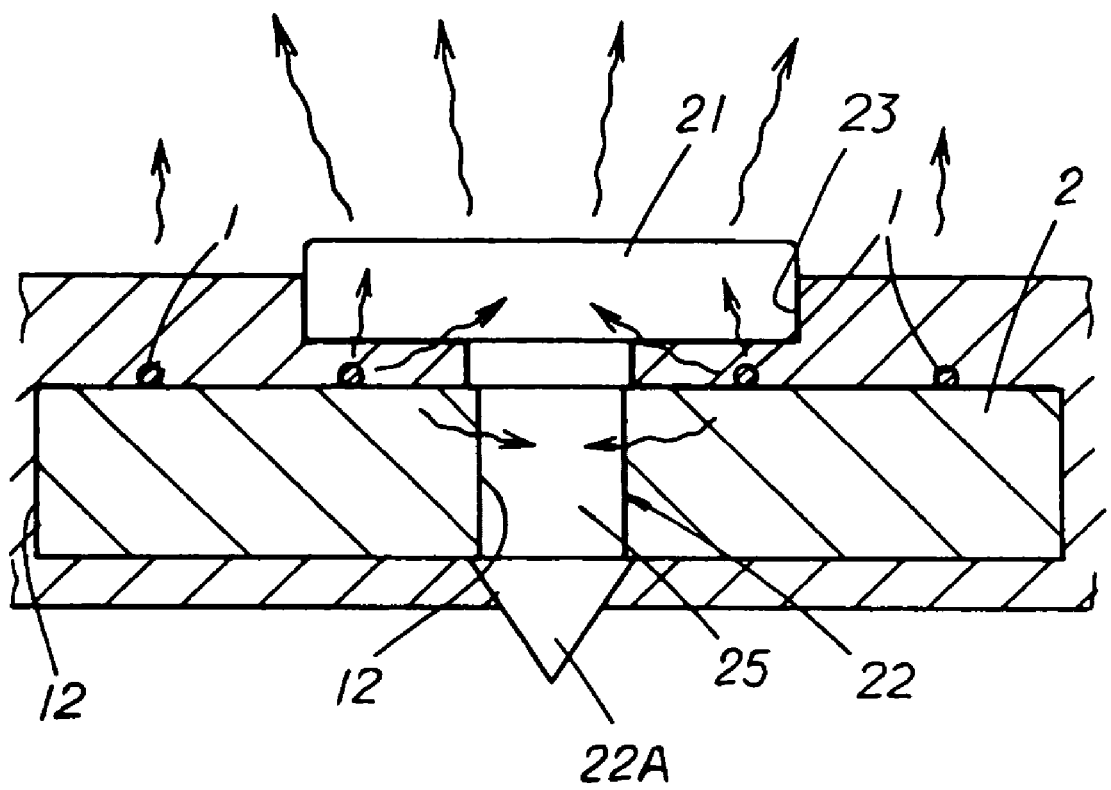
FIG. 20 is an explanatory front cross-sectional view of an essential part showing the heat conduction in the fifth embodiment.

Further, such a resin molded inner piece 2 constitutes the grip body A and the plate 21 is fixedly mounted on a surface of the resin. Further, for example, a resin-made grip outer cylindrical portion 3 is fitted on the inner piece 2 as shown in FIG. 9 and the plate 21 may be fixedly mounted on a surface of the resin. Further, for example, as shown in FIG. 11, for enhancing the design property and the grip feeling, opening portions 5 such as holes, notched portions or the like are formed in the grip outer cylindrical portion 3 (for example, made of metal), a resin member 6 having resiliency, which is formed separately, is inserted into the grip outer cylindrical portion 3 temporarily, a portion of the resin member 6 is exposed or exposed in a projecting manner from an opening portion 5 of the grip outer cylindrical portion 3, and the above-mentioned resin-molded inner piece 2 is inserted into the resin member 6 on which the grip outer cylindrical portion 3 is fitted thus constituting the grip body A. The plate 21 is fixedly mounted on the resin surface portion of the grip body A.

In this case, although mounting holes (penetration holes) which are communicated with the resin communication holes 12 may be formed in the front surface portion of the grip body A, using the resin member 6 (the resin surface portion of the grip body A) which is exposed on the grip outer cylindrical portion 3 (made of resin or metal) as a mounting surface, the insertion rods 22 of the plate 21 are allowed to penetrate the resin surface portion. Alternatively, the insertion rods 22 are inserted into the resin communication holes 12 of the inner piece 2 arranged inside through the penetration holes which are preliminarily formed so as to engage and fix the plate 21 to the inner piece 2. Particularly, by adopting the constitution which mounts the plate 21 on the resin surface portion and allows the insertion rods 22 to penetrate from the resin surface portion and to be inserted and engaged with the resin communication holes 12, it is possible to easily mount and fix the plate 21 while further reducing a cost.

Further, by forming a recessed portion 23 in the resin surface portion at the time of resin molding and by positioning the plate 21 in a state that the plate 21 is engaged with the recessed portion 23, the mounting strength with respect to a load which acts in the direction to rotate the plate 21 can be further enhanced and, at the same time, the plate 21 does not project from the front surface and hence, the design property and the grip feeling are not damaged.

Further, in this case, due to the formation of the recessed portion 23, a thickness of the resin portion is reduced correspondingly and hence, the insertion rods 22 can easily penetrate the resin communication holes 12. Further, even when the penetration holes or other marks are not formed particularly, by inserting the insertion rods 22 while engaging the plate 21 with the recessed portion 23, it is possible to provide the constitution which allows the automatic insertion and engagement of the insertion rods 22 into the resin communication holes 12 whereby it is possible to provide the innovative grip which exhibits extremely excellent practicability.

Further, by adhering and fixing the plate 21 using an adhesive agent (an adhesive tape or the like), the mounting strength can be further enhanced.

Further, by forming removal prevention engaging grooves 25 (removal preventing step portions) which are engaged with hole peripheries of the resin communication holes 12 in the insertion rods 22 of the plate 21, a removal preventing action also works by merely inserting the insertion rods 22 and hence, the mounting can be further easily performed and the plate 21 can be firmly engaged and fixed to the inner piece 2.

Further, with respect to the heater incorporated grip, as described above, the heater 1 is disposed in the inner piece 2. Here, a large number of resin communication holes 12 are arranged at positions which avoid the heater 1. Accordingly, by merely adopting the constitution which allows the selection of the resin communication holes 12 and the insertion of the insertion rods 22 in the resin communication holes 12 arranged at a plurality of given places, it is surely possible to firmly engage and fix the insertion rods 22 while avoiding the heater 1 without fail whereby it is possible to provide the innovative heater incorporated grip which can firmly attach the plate 21 with favorable durability.

Next, the seventh to thirteenth aspects of the invention, which are characterized by using the plate 21 as a heating element (member) for example a heating plate or a heating spot, are described.

In mounting the plate 21 formed of a material which exhibits the favorable heat conductivity such as metal, for example, on the resin surface portion of the grip body A, the recessed portion 23 to which the plate 21 is provided is formed in the resin surface portion, for example, and the plate 21 is disposed in the recessed portion 23. By mounting the plate 21 on a thin wall portion, heat generated by the heater 1 is easily transferred to the plate 21. Alternatively, a heat conduction portion which improves the heat conduction of the insertion rods 22 or the like to the surface of the plate 21, for example, is mounted on the plate 21.

Due to such a constitution, compared to a case in which the metal-made plate 21 is laminated to the resin surface portion, due to the favorable heat conduction through the thin wall portion formed by the recessed portion 23 or the heat conduction portion, the plate 21 is elevated to a high temperature compared to other resin surface portions.

Further, by accommodating the plate 21 in the recessed portion 23, the projecting of the plate 21 from the surface can be suppressed (for example, the plate 21 can be provided in a substantially coplanar state) and hence, even when a gripping force or a load in the rotational direction attributed to a throttle manipulation frequently works, the mounting strength can be enhanced. Further, by providing the insertion rods 22 as the heat conduction portions as described the above, and by inserting the insertion engagement of the insertion rods 22 in the resin communication passages (holes) 12 for applying the resin by molding on inner and outer surfaces of the inner piece 2, for example, by allowing the insertion rods 22 to penetrate the resin communication holes 12, the mounting strength of the plate 21 can be remarkably enhanced with a simple constitution and using an extremely simple mounting technique without incurring a cost.

In this manner, the plate 21 is configured to be elevated to a high temperature due to the thermal influence of the heater 1 and the plate 21 is disposed at a position where the plate 21 is to be heated.

For example, the plate 21 is arranged at positions where a rider's finger tips for holding the grip are disposed or at positions where roots of fingers at distal ends of the rider's palm are disposed during traveling on a motorcycle.

To be more specific, a plurality of plates 21 are fixedly mounted in the longitudinal direction of the grip at portions corresponding to the positions where the roots of the rider's fingers are disposed, for example, as described above. Alternatively, a laterally elongated plate 21 having a width and a length which substantially correspond such a range is fixedly mounted.

Due to such a constitution, the portions where the plate 21 is arranged constitute heat spots due to the heat of the heater 1 and are elevated to a high temperature compared to other resin surface portions. Since the whole periphery of the resin surface portion is not heated, the large electric power consumption is not necessary. Particularly, the portions to be strongly heated can be heated and held at the heated temperature efficiently with a simple constitution. Further, since the heat is transferred easily, a temperature adjustment control of the heat spots can be properly performed with favorable responsiveness.

Further, with the provision of the plate 21, the design property can be enhanced and the plate 21 can be also used as a display plate which displays a trade mark or the like.

Further, with the provision of the above-mentioned insertion rods 22, the plate 21 can be simply and fixedly mounted on the grip body A and can be firmly mounted on the grip body A with reinforcement by adhesion fixing.

Further, by adopting the constitution which makes use of the resin communication holes 12 formed in the inner piece 2 in a state that the insertion rods 22 are inserted into the resin communication holes 12 for fixing the plate, it is possible to extremely firmly fix the plate 21 with a simple constitution and at a low cost.

In this manner, by inserting and fixing the insertion rods 22 extending vertically from the plate 21 in the resin communication holes 12 formed in the inner piece 2 while engaging the plate 21 with the recessed portion 23, for example, the mounting strength can be extremely enhanced and the mounting can be also easily performed. Further, since the plate 21 can be arranged at the thin-wall portion due to the provision of the recessed portion 23 and the insertion rods 22 can be arranged close to the heater 1 and function as the heat conduction portions, the plate 21 is elevated to the high temperature with further improved responsiveness. Further, since the arrangement and the mounting can be facilitated as described above, it is possible to easily form the heat spots in place.

First of all, the embodiments according to the first to sixth aspects of the invention (first to fourth embodiments) shown in FIG. 1 to FIG. 11 are explained.

This embodiment is directed to the grip incorporating the heater therein (when the heater incorporated grip is used, an electric wire lead portion 11 may be formed on a proximal end flange portion 7 formed on a proximal-end side end portion which forms a base portion of the grip body A described later). That is, this embodiment is directed to the grip in which the heater 1 is arranged in the inner piece 2 and the resin mold is applied to the inner piece 2 to form the grip body A, and the metal-made plate 21 on which the trade mark or the like is displayed is fixedly mounted on the resin surface portion of the grip body A.

The inner piece 2 which is provided with the heater 1 constitutes a core of the grip body A and is formed in a cylindrical shape using hard resin. In mounting the inner piece 2 as a handle of a motorcycle, for example, the grip is mounted in a state that the inner piece 2 is fitted on the mounting portion 4 such as a handle pipe, a throttle pipe or the like.

Further, the heater 1 is arranged on the surface of the inner piece 2 in a state that the string-like heater 1 is wound on the surface of the inner piece 2 uniformly within a given range or the planar heater 1 in a film shape which is preliminarily manufactured is wound on the surface of the inner piece 2. Then, the inner piece 2 is placed in a forming mold, for example, and is formed by resin molding to form the heater 1 in the inner piece 2 in an embedded manner. Here, the resin communication holes 12 are formed in the inner piece 2 at positions which avoid the string-like heater 1, or at positions which avoid the heater portions 1 of the planar heater 1 in case that the planar heater 1 is wound on the inner piece 2 and, at the same time, at positions where the resin communication holes 12 are arranged close to the heater 1 as much as possible.

Further, although the surface of the inner piece 2 is covered with the resin due to such resin molding, the resin also wraps around the inner surface of the inner piece 2 through the resin communication holes 12, and the resins on the outer and inner surfaces are integrally formed with each other thus enhancing the covering strength of the resin whereby a holding force of the heater 1 can be also enhanced.

Further, using the resin which wraps around the inside of the inner piece 2, a plurality of projecting ridges are formed on the inside of the inner piece 2 in the longitudinal direction of the inner piece 2 and hence, when the grip is mounted by inserting the mounting portion 4 into the inner piece 2, the mounting portion 4 is resiliently held by the inner piece 2.

Figure 10:
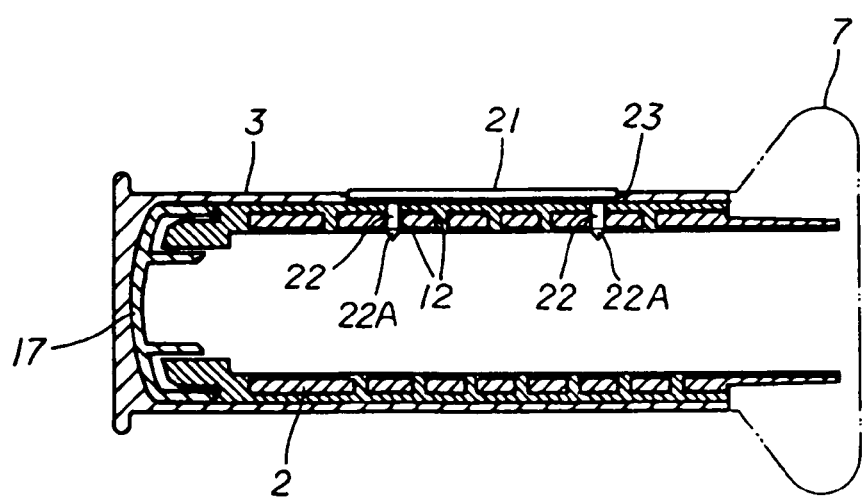
FIG. 10 is a front cross-sectional view of another embodiment (third embodiment)

In this embodiment, the grip body A which incorporates the heater therein is constituted by arranging the heater 1 in the inner piece 2 and by molding the heater 1 with resin. However, as shown in FIG. 9 and FIG. 10, the resin-made grip outer cylindrical portion 3 may be fitted on the inner piece 2 molded with resin thus constituting the grip body A. Although the grip outer cylindrical portion 3 may be formed of the resin member in this manner, as shown in FIG. 11, on the resin member 6 which is fitted on the inner piece 2, the metal-made grip outer cylindrical portion 3 having opening portions 5 which exposes the resin member 6 is fitted on and, thereafter, the inner piece 2 is inserted into the resin member 6 which is fitted on the grip outer cylindrical portion 3 thus constituting the grip body A. In this case, the inner piece 2 is made of resin which is harder than the resin member 6, while the resin member 6 is made of rubber softer than the inner piece 2. For example, to be more specific, the inner piece 2 is made of polybutylene terephthalate (PBT) and the resin member is made of a mixed material of acrylic nitrile (NBR) and polyvinyl chloride (PVC).

In this manner, although the grip body A can be formed by various techniques, in this embodiment, the metal-made plate 21 which displays a trade mark or the like thereon is fixedly mounted on the resin surface portion of the grip body A.

To be more specific, the recessed portion 23 is formed in the resin surface portion of the surface portion of the grip body A by resin molding, and the plate 21 is engageably disposed in the recessed portion 23 in an approximately coplanar state and is fixed to the recessed portion 23 by an adhesive agent. Further, the spearheaded insertion rods 22 which extend substantially perpendicular to the plate 21 penetrate the thin-walled resin portion of the recessed portion 23 and the insertion rods 22 are inserted into the resin communication holes 12 positioned in the recessed portion 23 and hence, the plate 21 is engaged with and is fixed to the resin surface portion of the grip body A.

Further, since the wall thickness of the resin portion becomes thin corresponding to the formation of the recessed portion 23, the insertion rods 22 can easily penetrate the resin communication holes 12. Further, although the penetration holes which are guided to the resin communication holes 12 may be formed in the bottom portion of the recessed portion 23, even when the penetration holes and other markings are not formed, by inserting the insertion rods 22 while engaging the plate 21 with the recessed portion 23, it is possible to provide the constitution which allows the automatic insertion and engagement of the insertion rods 22 into the resin communication holes 12 which are formed at positions which avoid the heater 1.

Accordingly, due to the arrangement of the recessed portion 23 with which the plate 21 is engaged, by allowing the insertion rods 22 to penetrate the resin surface portions while engaging the plate 21 with the recessed portion 23, it is surely possible to allow the) insertion rods 22 to be inserted and firmly engaged and fixed to the resin communication holes 12 while avoiding the heater 1 whereby it is possible to provide the innovative heater incorporated grip which can firmly attach the plate 21 to the grip body with favorable durability.

Further, in this embodiment, distal ends of the respective insertion rods 22 are spearheaded to facilitate the penetration and hence, even when the penetration holes which are communicated with the resin communication holes 12 are not formed in the resin surface portion particularly, the insertion rods 22 can penetrate. Further, when bulging portions 22A are formed on the distal end portions of the insertion rods 22 and the insertion rods 22 are pushed into the resin communication holes 12, the bulging portions 22A form umbrellas thus performing a removal preventing function. Further, in this embodiment, a removal prevention engaging groove 25 which is engaged with the whole circumference of a hole periphery of the resin communication hole 12 is formed on a surface of a proximal end side which constitutes a base side of the bulging portion 22A of the insertion rod 22.

Accordingly, by merely inserting the insertion rods 22 into the resin communication holes 12, the removal preventing action is generated due to the provision of the bulging portions 22A and, at the same time, the hole periphery is engaged with the removal prevention engaging groove 25 and hence, the rod-inserted state is locked, thus further enhancing the removal preventing function and, at the same time, play can be substantially eliminated whereby it is possible to firmly fix the plate 21 to the grip body A.

Figure 8A:
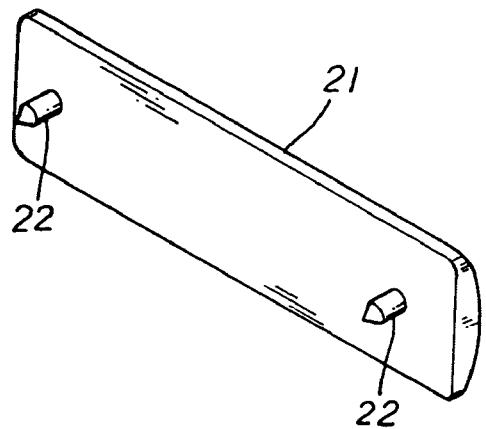
Figure 8B:
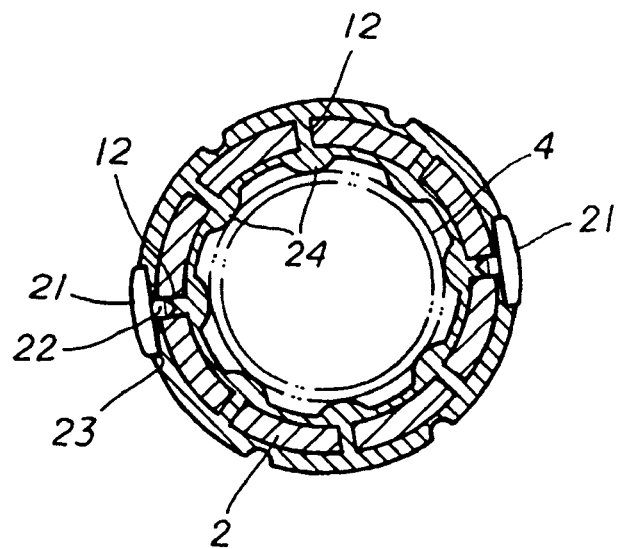

It is needless to say that the insertion rods 22 are simply projected from and are engaged with the resin communication holes 12 as shown in FIG. 8A and FIG. 8B.

Further, in this embodiment, a proximal-end flange portion 7 is formed on the proximal-end-side end portion which constitutes the base side of the grip body A, and the proximal-end flange portion 7 and the grip body A are connected to each other, and the distal end portion of the grip body A is closed by a cap 17 thus forming a grip. In this embodiment, a plurality of bosses 15 are formed on a vehicle center side (an end portion of the inner piece 2 which constitutes the base side of the grip body A), boss engaging portions 16 in which the boss portions 15 are inserted are formed on the proximal-end flange portion 7, and after the bosses 15 and the boss engaging portions 16 are engaged with each other and adhered to each other, the bosses 15 are welded by melting thus firmly connecting the proximal-end flange portion 7 and the inner piece 2 to each other.

Next, the embodiments according to the seventh to thirteenth aspects of the invention (fifth to tenth embodiments) shown in FIG. 12 to FIG. 26 are explained.

This embodiment is directed to the heater incorporated grip as described above, wherein the heater 1 is provided to the inner piece 2 and the inner piece 2 is molded with resin thus forming the grip body A, the metal-made plate 21 which can also display a trade mark or the like is fixedly mounted on the resin surface portion of the grip body A with the insertion of the insertion rods 22 and with the use of an adhesive agent at plural portions or in a shape which wholly covers a given range, and a range where the plate 21 is formed constitutes a heat spot.

Figure 22:
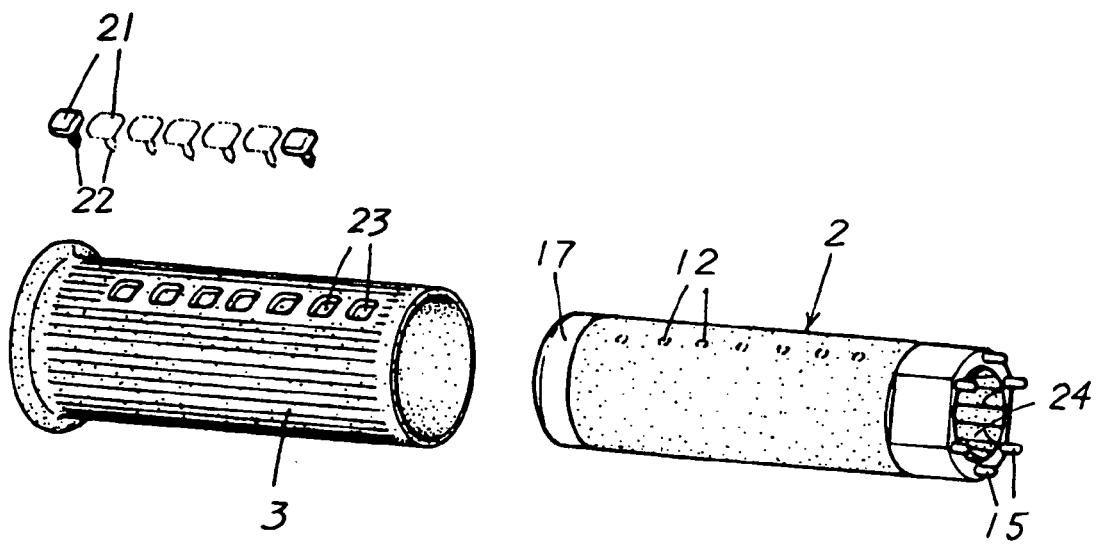
FIG. 22 is an explanatory exploded perspective view of another embodiment (seventh embodiment)
Figure 23:
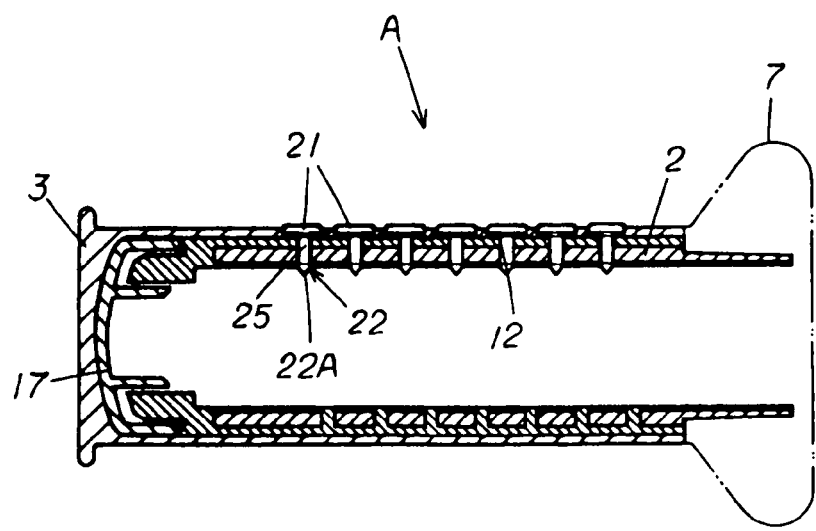
FIG. 23 is a front cross-sectional view of another embodiment (seventh embodiment)
Figure 24:
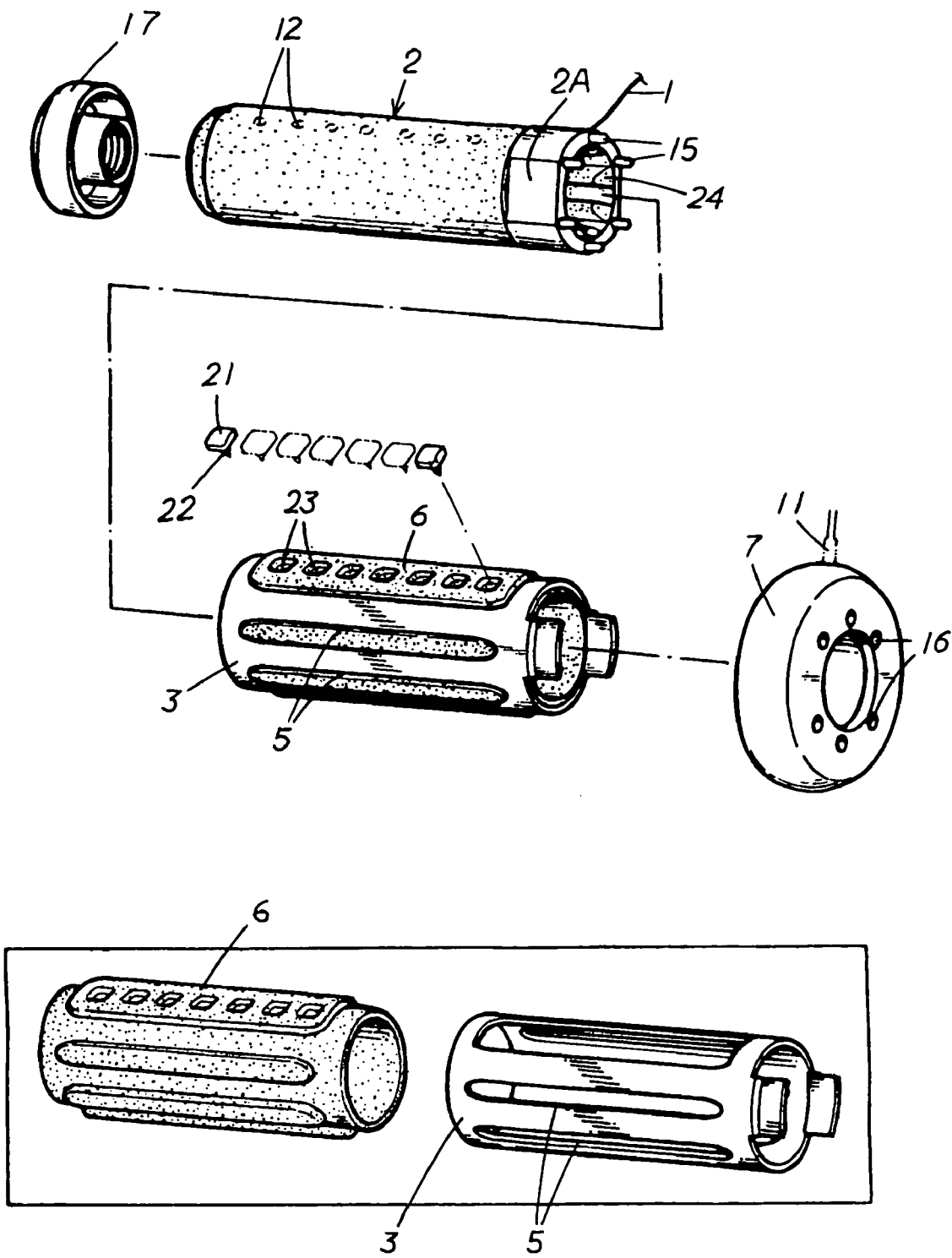
FIG. 24 is an explanatory exploded perspective view of another embodiment (eighth embodiment)

In this embodiment, in the same manner as the above-mentioned embodiments, the heater 1 is provided to the inner piece 2 and the inner piece 2 is molded with resin so as to form the heater incorporated grip body A. However, as shown in FIG. 22 and FIG. 23, for example, in the same manner as the above-mentioned embodiment, the resin-made grip outer cylindrical portion 3 may be fitted on the inner piece 2 which is molded with the resin thus constituting the grip body A. Although the grip outer cylindrical member 3 may be formed of the resin member in this manner, as shown in FIG. 24, the metal-made grip outer cylindrical portion 3 having the opening portions 5 which expose the resin member 6 may be fitted on the resin member 6 which is fitted on the inner piece 2 and, thereafter, the inner piece 2 is inserted into the resin member 6 which is fitted on the grip outer cylindrical portion 3 thus constituting the grip body A. In this case, the inner piece 2 is made of resin which is harder than the resin member 6, while the resin member 6 is made of rubber softer than the inner piece 2. For example, to be more specific, the inner piece 2 is made of polybutylene terephthalate (PBT) and the resin member is made of a mixed material of acrylic nitrile (NBR) and polyvinyl chloride (PVC).

In this manner, although the grip body A can be formed by various techniques, in this embodiment, the plate 21 which is heated or whose temperature is elevated due to the thermal influence of the heater 1 is attached to the resin surface portion of the grip body A at a position where the heating or the temperature elevation of the resin surface portion of the grip body A is desired.

To be more specific, the recessed portion 23 is formed in the resin portion of the surface portion of the grip body A by resin molding, and the plate 21 is engageably disposed in the recessed portion 23 in an approximately coplanar state and is fixed to the recessed portion 23 by an adhesive agent. Further, the spearheaded insertion rods 22 which extend substantially perpendicular to the plate 21 penetrate the thin-walled resin portion of the recessed portion 23 and the insertion rods 22 are inserted into the resin communication holes 12 positioned in the recessed portion 23 and the plate 21 is fixed to the grip body A by insertion engagement.

Figure 25:
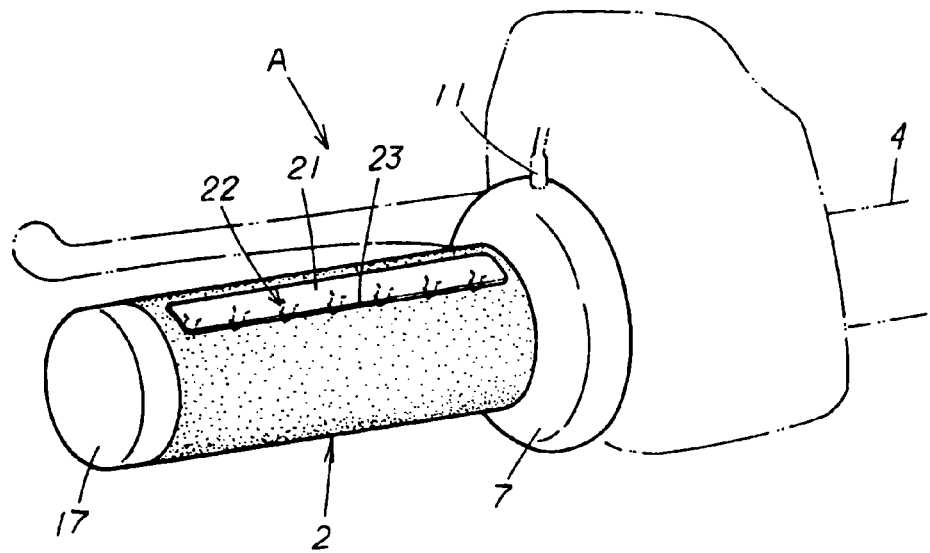
FIG. 25 is a perspective view of another embodiment (ninth embodiment)
Figure 26:
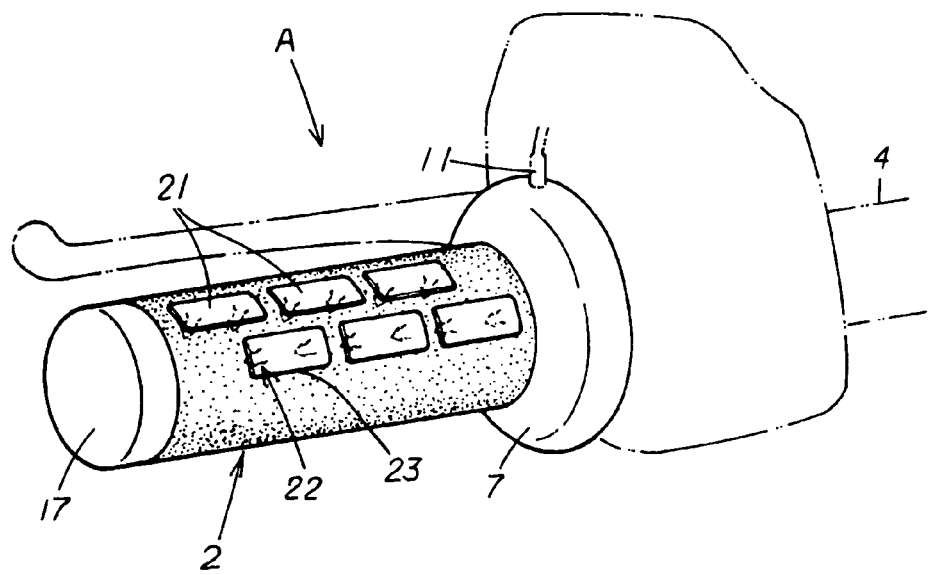
FIG. 26 is a perspective view of another embodiment (tenth embodiment).

Further, for example, as shown in FIG. 25, the recessed portion 23 may be formed in a given shape which has a length in the longitudinal direction of the grip body A or, as in the case of this embodiment or as shown in FIG. 26, a plurality of recessed portions 23 are arranged in parallel in the above-mentioned longitudinal direction and a given range of a gripping position on the surface of the grip body A is set as a heat spot attributed to heat of the plate 21.

To be more specific, for example, the plate 21 is arranged at positions where rider's finger tips for holding the grip are disposed or positions where roots of fingers at distal ends of the rider's palm are disposed during travel on a motorcycle.

That is, a large number of plates 21 are fixed in one row or a plurality of rows as shown in FIG. 26 in the longitudinal direction of the grip at portions which correspond to positions of roots of the rider's fingers, or as shown in FIG. 25, one or a plurality of laterally elongated plates 21 which respectively have a width and a length which correspond to such a range may be fixed and heat spots are formed at positions. Here, although the plates 21 are arranged only in the vicinity of the root portions of rider's fingers in all drawings, the plates 21 may be arranged at fingertip portions opposite to the root portions. The heat spot forming range attributed to the arrangement of the plate 21 can be suitably designed.

Accordingly, in this embodiment, by inserting and fixing the insertion rods 22 extending substantially perpendicular to the plate 21 in the resin communication holes 12 formed in the inner piece 2 while engaging the plate 21 with the recessed portion 23, the mounting strength of the plate 21 can be extremely enhanced and the mounting of the plate 21 can be also easily performed. Further, since the plate 21 can be arranged at the thin-wall portion due to the provision of the recessed portion 23 and the insertion rods 22 can be arranged close to the heater 1 and functions as the heat conduction portions, the plate 21 is elevated to the high temperature with the further improved responsiveness. Further, since the setting of arrangement and the mounting can be facilitated as described above, it is possible to easily form the heat spots in place.

Further, since the wall thickness of the resin portion becomes thin corresponding to the formation of the recessed portion 23, the insertion rods 22 can easily penetrate the resin communication holes 12. Further, although the penetration holes which are guided to the resin communication holes 12 may be formed in the bottom portion of the recessed portion 23, even when the penetration holes and other markings are not particularly formed, by inserting the insertion rods 22 while engaging the plate 21 with the recessed portion 23 in a state that the insertion rods 22 are arranged close to the heater 1, it is possible to provide the constitution which allows the automatic insertion and engagement of the insertion rods 22 in the resin communication holes 12 which are formed at positions which avoid the heater 1.

Accordingly, due to the arrangement of the recessed portion 23 with which the plate 21 is engaged, by allowing the insertion rods 22 to penetrate the resin surface portions while engaging the plate 21 with the recessed portion 23, it is surely possible to allow the insertion rods 22 to be inserted and firmly engaged and fixed to the resin communication holes 12 at positions close to the heater 1 while avoiding the heater 1 without fail whereby it is possible to provide the innovative heater incorporated grip which can firmly attach the plate 21 to the grip body with favorable durability and can easily form the heat spots at desired positions as mentioned previously.

Further, in the same manner as the previously-mentioned embodiment, bulging portions 22A are formed on the distal end portions of the respective insertion rods 22 and, further, a removal prevention engaging groove 25 which is engaged with the whole circumference of a hole periphery of the resin communication hole 12 is formed on a surface of a proximal portion side which constitutes a base side of the bulging portion 22A of the insertion rod 22.

Figure 21A:
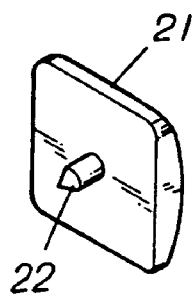
Figure 21B:
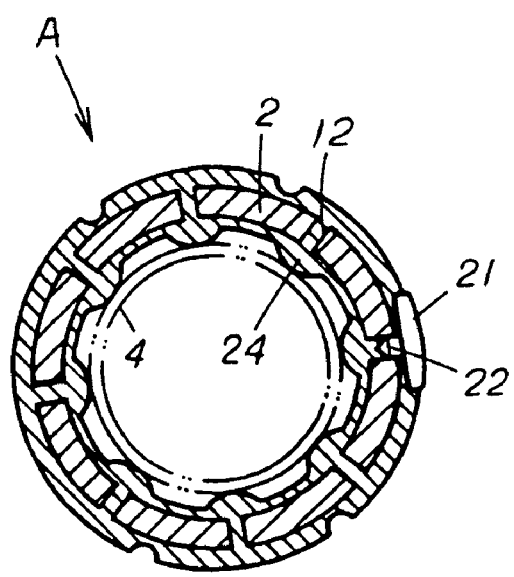

It is needless to say that the insertion rods 22 may be simply projected and engaged with the resin communication holes 12 as shown in FIG. 21A and FIG. 21B.

Accordingly, by merely inserting the insertion rods 22 into the resin communication holes 12, the removal preventing action is generated due to the provision of the bulging portions 22A and, at the same time, the hole periphery is engaged with the removal prevention engaging groove 25 and hence, the inserted state is locked thus further enhancing the removal preventing function and, at the same time, play can be substantially eliminated whereby it is possible to firmly fix the plate 21 to the grip body A.

Further, as mentioned previously, although the plate 21 and the insertion rods 22 are made of metal and possess the favorable heat conductivity, at least the insertion rods 22 are made of a material having favorable thermal electric conductivity (material having low thermal resistance) such as a material which is obtained by applying chromium plating to a surface of aluminum or iron, for example.

Further, in this embodiment, in the same manner as the previously mentioned embodiments, the proximal-end flange portion 7 is formed on the grip body A and the proximal-end flange portion 7 and the grip body A are firmly connected and fixed to each other.

Here, the present invention is not limited to the embodiments explained heretofore and the specific constitutions of the respective constitutional features are suitably designed without departing from the technical concept of the present invention.

What is claimed is:

1. A grip body for a grip, comprising:
a mounting portion;
an inner piece supported by said mounting portion, said inner piece having inner and outer surfaces, and at least a resin communication passage therebetween;
a resin layer simultaneously molded on said inner and outer surfaces of said inner piece, by resin extending therebetween through said resin communication passage; and
at least one plate having an insertion rod formed thereon, wherein said plate is fixed to said inner piece by insertion engagement of said insertion rod into said resin communication passage,
wherein said resin communication passage is filled with said resin layer,
wherein said resin layer includes:

a first resin layer formed on said inner surface of said inner piece; and a second resin layer formed on said outer surface of said inner piece, wherein the first resin layer and the second resin layer are communicated and integrally formed with each other through said resin communication passage, and wherein the outer circumference of the inner piece is entirely covered by the second resin layer in a cross sectional view perpendicular to the longitudinal direction of said grip body.

2. The grip body of claim 1, wherein said inner piece is cylindrical and is formed of a resin, said grip body further comprising a grip outer cylindrical portion fitted outside of said inner piece.

3. The grip body of claim 1, wherein a portion of said resin layer or said outer surface of said inner piece includes a recess formed therein, wherein said plate is disposed in said recess.

4. The grip body of claim 1, wherein inwardly extending, press-fit holding resin projections, engageable with said mounting portion, are formed as part of said resin layer on said inner surface of said inner piece, such that said inner piece is resiliently supported by said mounting portion.

5. The grip body of claim 1, wherein an insertion end of said insertion rod includes a removal preventing step portion.

6. The grip body of claim 1, further comprising a heating element formed on said inner piece, and wherein said resin communication passage avoids said heating element.

7. A grip body for a grip, comprising:

a mounting portion;

an inner piece supported by said mounting portion, said inner piece having a heating element, inner and outer surfaces, and at least a resin communication passage therebetween;

a resin layer integrally supported on said mounting portion, said resin layer is constituted such that resin which covers said inner piece forms a surface portion or fits a grip outer cylindrical portion on said inner piece provided with the heating element directly or by way of a resin member thus forming a resin portion on a front surface of said grip body; and at least one plate formed on said resin layer, wherein said plate which is heated or whose temperature is elevated by heat of the heating element is attached at a position where the heating or the elevation of temperature of a resin surface portion of the grip body is desired, wherein said plate is having an insertion rod formed thereon, said insertion rod is mounted substantially perpendicular to the plate as a heat conduction portion in a state that the insertion rod penetrates the resin portion and is arranged close to the heating element thus obtaining a favorable transfer of heat of the heating element to the plate, wherein the resin layer is simultaneously molded on said inner and outer surfaces of said inner piece, by resin extending therebetween through said resin communication passage, wherein said resin communication passage is filled with said resin layer, wherein said resin layer includes:

a first resin layer formed on said inner surface of said inner piece; and a second resin layer formed on said outer surface of said inner piece, wherein the first resin layer and the second resin layer are communicated and integrally formed with each other through said resin communication passage, and wherein the outer circumference of the inner piece is entirely covered by the second resin layer in a cross sectional view perpendicular to the longitudinal direction of said grip body.

8. The grip body of claim 7, wherein a portion of said resin layer or said outer surface of said inner piece includes a recess formed therein, wherein said plate is disposed in said recess.

9. The grip body of claim 7, wherein an insertion end of said insertion rod includes a removal preventing step portion.

10. The grip body of claim 7, wherein said plate is fixed into said resin communication passage by insertion engagement of said insertion rod.

11. The grip body of claim 7, wherein said plate and said insertion rod are made of metal.

12. The grip body of claim 7, wherein inwardly extending, press-fit holding resin projections, engageable with said mounting portion, are formed as a part of said resin layer on said inner surface of said inner piece, such that said inner piece is resiliently supported by said mounting portion.

13. The grip body of claim 7, wherein said plate has a length in the longitudinal direction of the grip body.

14. The grip body of claim 7, wherein said grip body has a plurality of plates disposed in the longitudinal direction of the grip body.

15. The grip body of claim 7, wherein said grip body has a plurality of plates disposed in a circumferential direction of the surface of the grip body.

* * * * *